US010700579B2

(12) United States Patent
Huang et al.

(10) Patent No.: US 10,700,579 B2
(45) Date of Patent: Jun. 30, 2020

(54) METHOD AND ASSEMBLY OF A GENERATOR

(71) Applicant: GE AVIATION SYSTEMS, LLC, Grand Rapids, MI (US)

(72) Inventors: Hao Huang, Troy, OH (US); Xiaochuan Jia, Centerville, OH (US)

(73) Assignee: GE Aviation Systems LLC, Grand Rapids, MI (US)

( * ) Notice: Subject to any disclaimer, the term of this patent is extended or adjusted under 35 U.S.C. 154(b) by 716 days.

(21) Appl. No.: 15/215,087

(22) Filed: Jul. 20, 2016

(65) Prior Publication Data

US 2018/0026504 A1 Jan. 25, 2018

(51) Int. Cl.
H02K 15/14 (2006.01)
H02K 5/20 (2006.01)
H02K 15/02 (2006.01)
H02K 5/10 (2006.01)
H02K 9/24 (2006.01)

(52) U.S. Cl.
CPC .............. *H02K 15/14* (2013.01); *H02K 5/20* (2013.01); *H02K 15/02* (2013.01); *H02K 5/10* (2013.01); *H02K 9/24* (2013.01)

(58) Field of Classification Search
CPC .. H02K 5/10; H02K 5/20; H02K 9/24; H02K 15/02; H02K 15/14
USPC .......................... 310/52, 54, 61, 63, 64, 89
See application file for complete search history.

(56) References Cited

U.S. PATENT DOCUMENTS

| 3,740,596 A * | 6/1973 | Curtis | H02K 9/005 310/54 |
| 4,728,840 A * | 3/1988 | Newhouse | H02K 47/20 310/113 |
| 5,966,299 A | 10/1999 | Rhew et al. | |
| 9,729,027 B2 * | 8/2017 | Miyamoto | H02K 1/32 |
| 10,084,359 B2 * | 9/2018 | Kiyokami | H02K 1/2706 |
| 10,116,178 B2 | 10/2018 | Horii et al. | |
| 2010/0045125 A1 | 2/2010 | Takenaka et al. | |
| 2012/0299404 A1 * | 11/2012 | Yamamoto | H02K 1/2766 310/61 |

(Continued)

FOREIGN PATENT DOCUMENTS

| CN | 102714438 A | 10/2012 |
| JP | 2008219960 A | 9/2008 |

(Continued)

OTHER PUBLICATIONS

Chinese Office Action issued in related Chinese Patent Application No. 201710594858.9, dated Mar. 4, 2019.

(Continued)

*Primary Examiner* — Alfonso Perez Borroto
*Assistant Examiner* — Rashad H Johnson
(74) *Attorney, Agent, or Firm* — McGarry Bair PC

(57) ABSTRACT

A generator includes a stator core having a set of stator poles formed by a post and a wire wound about the post to form a stator winding, with the stator winding having end turns, a rotor having a set of rotor poles and configured to rotate relative to the stator and a rotor channel for liquid coolant to flow through the rotor to a set of coolant apertures, and a set of rotor pole coolant channels aligned with and proximate to the set of rotor poles. The liquid coolant flow extracts heat from the generator.

22 Claims, 8 Drawing Sheets

(56) References Cited

U.S. PATENT DOCUMENTS

| | | | | |
|---|---|---|---|---|
| 2016/0020673 A1* | 1/2016 | Pal | ............... | H02K 9/005 |
| | | | | 310/54 |
| 2016/0149450 A1* | 5/2016 | Horii | ............... | H02K 1/32 |
| | | | | 310/54 |
| 2016/0261158 A1* | 9/2016 | Horii | ............... | H02K 1/32 |
| 2017/0207683 A1* | 7/2017 | Anghel | ............ | H02K 9/197 |

FOREIGN PATENT DOCUMENTS

| | | |
|---|---|---|
| JP | 2009118686 A | 5/2009 |
| JP | 2013183508 A | 9/2013 |
| JP | 20150874451 | 6/2015 |

OTHER PUBLICATIONS

Chinese Patent Office, Office Action re Chinese Patent Application No. 201710594858.9, dated Dec. 20, 2019, 5 pages, China.

\* cited by examiner

METHOD AND ASSEMBLY OF A GENERATOR

BACKGROUND OF THE INVENTION

Contemporary aircraft engines include electric machines, or generator systems, which utilize a running aircraft engine in a generator mode to provide electrical energy to power systems and components on the aircraft. Some aircraft engines can further include starter/generator (S/G) systems, which act as a motor to start an aircraft engine, and as a generator to provide electrical energy to power systems on the aircraft after the engine is running. Motors and generators can be wet cavity systems, wherein a cavity housing the rotor and stator is exposed to liquid coolant, or dry cavity systems, wherein the cavity is not exposed to liquid coolant. Dry cavity systems can also utilize liquid coolant in one or more contained cooling systems, but they are still considered dry cavity so long as the cavity is not exposed to liquid coolant. Both contemporary types of wet or dry cavity systems have respective advantages. For example, dry cavity systems generally have less losses, higher efficiency, higher reliability, less required maintenance, and attitude independence over wet cavity systems. In contrast, the power density of a wet cavity electric machine can be considerably higher than that of a dry cavity electric machine due to its higher cooling effectiveness.

The operating requirements or the operating environment of a generator system can increase the cooling requirements for either a wet cavity or dry cavity system. For example, generator systems proximate to the high temperature environment of a turbine engine can further include an external cooling jacket surrounding the stator or generator, whereby the cooling jacket exposes the outer surface of the stator to coolant traversing a cooling jacket. The addition of cooling systems typically increases the costs, complexity, and adds to the weight and size requirements of the generator system.

BRIEF DESCRIPTION OF THE INVENTION

In one aspect, a generator includes a stator core having a set of stator poles formed by a post and a wire wound about the post to form a stator winding, with the stator winding having end turns, a rotor having a set of rotor poles and configured to rotate relative to the stator and a rotor channel for liquid coolant to flow through the rotor to a set of coolant apertures, and a set of rotor pole coolant channels aligned with and proximate to the set of rotor poles. The generator can be selectively configured to operate as a wet cavity generator by coupling a set of nozzles with at least a subset of the coolant apertures such that liquid coolant traversing the rotor channel is ejected from the set of nozzles to the stator winding end turns to extract heat from the stator windings, or as a dry cavity generator by fluidly coupling at least a subset of the coolant apertures to the rotor pole coolant channels such that liquid coolant traversing the rotor channel flows through the rotor pole coolant channels to extract heat from the set of rotor poles.

In another aspect, a method of assembling a generator includes determining whether a generator having a stator core with a set of stator winding end turns and a rotor with a rotor channel fluidly connected to a set of coolant apertures and a set of rotor pole coolant channels aligned with and proximate to a set of rotor poles and fluidly connected to the rotor channel is to be configured to operate as a wet cavity generator or a dry cavity generator. If the generator is to operate as a wet cavity generator, the method includes selectively coupling a set of nozzles with at least a subset of the coolant apertures such that liquid coolant traversing the rotor channel is ejected from the set of nozzles to the stator winding end turns to extract heat from the stator windings during generator operation. If the generator is to operate as a dry cavity generator, the method includes selectively fluidly coupling at least a subset of the coolant apertures to the set of rotor pole coolant channels aligned with and proximate to the set of rotor poles such that liquid coolant traversing the rotor channel flows through the rotor pole coolant channels to extract heat from the set of rotor poles during generator operation.

In yet another aspect, a method of converting a dry cavity generator to a wet cavity generator includes removing a liquid coolant fluid coupling between a rotor and a set rotor pole coolant channels aligned with and proximate to a set of rotor poles, leaving a set of rotor coolant apertures fluidly coupled with a rotor channel for liquid coolant, and selectively coupling a set of nozzles with at least a subset of the rotor coolant apertures such that liquid coolant traversing the rotor channel is ejected from the set of nozzles to a set of stator winding end turns to extract heat from the stator windings during generator operation.

DESCRIPTION OF EMBODIMENTS OF THE INVENTION

Aspects of the disclosure can be implemented in environments using an electric motor regardless of whether the electric motor provides a driving force or generates electricity. For purposes of this description, such an electric motor will be generally referred to as an electric machine, electric machine assembly, or similar language, which is meant to clarify that one or more stator/rotor combinations can be included in the machine. While this description is primarily directed toward an electric machine providing power generation, it is also applicable to an electric machine providing a driving force or an electric machine providing both a driving force and power generation. Further, while this description is primarily directed toward an aircraft environment, aspects of the invention are applicable in environments using an electric machine. Thus, a brief summary of a contemplated environment should aid in a more complete understanding.

Figure 1:
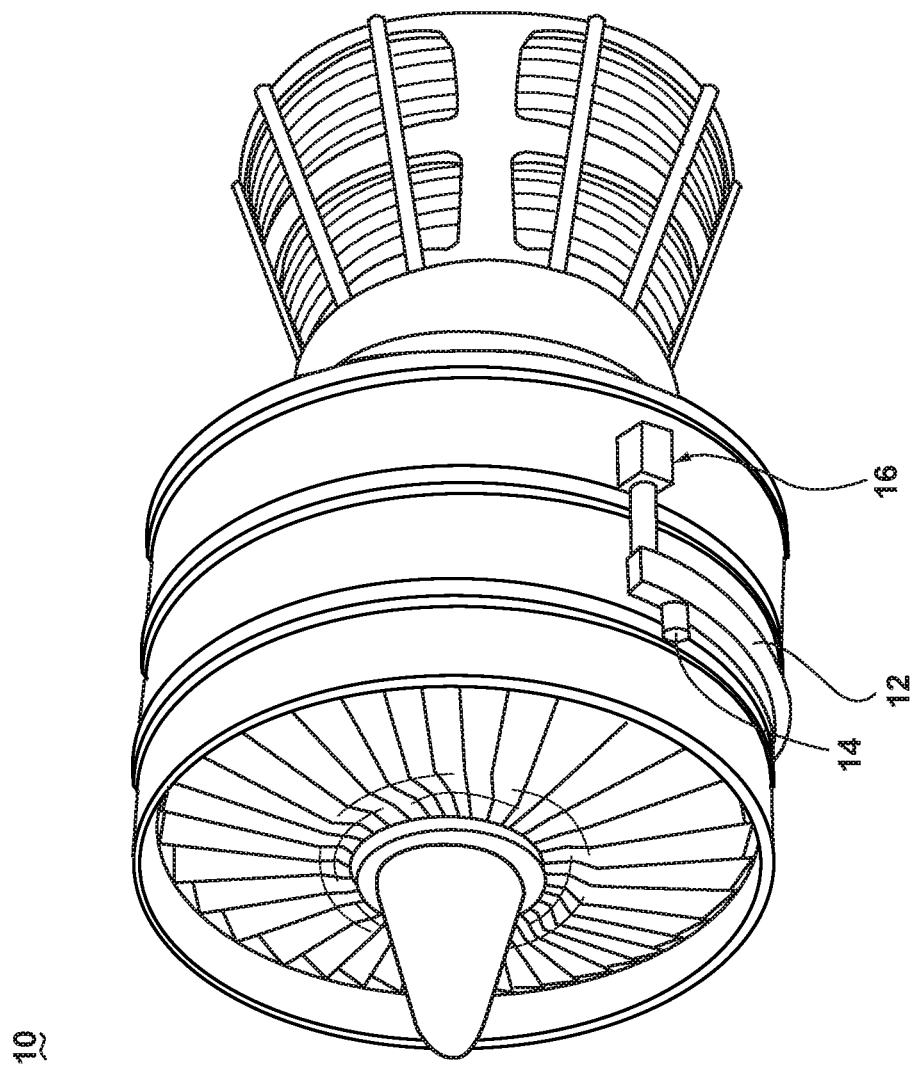
FIG. 1 is a perspective view of a gas turbine engine having a starter/generator (S/G) in accordance with various aspects described herein.

While "a set of" various elements will be described, it will be understood that "a set" can include any number of the respective elements, including only one element. FIG. 1 illustrates a gas turbine engine 10 having an accessory gear box (AGB) 12 and a starter/generator (S/G) 14 according to an aspects of the invention. The gas turbine engine 10 can be a turbofan engine, such as a General Electric GEnx or CF6 series engine, commonly used in modern commercial and military aviation or it could be a variety of other known gas turbine engines such as a turboprop or turboshaft. The gas turbine engine 10 can also have an afterburner that burns an additional amount of fuel downstream of the low pressure turbine region to increase the velocity of the exhausted gases, and thereby to increase thrust. The AGB 12 can be coupled to a turbine shaft (not shown) of the gas turbine engine 10 by way of a mechanical power take off 16. The gas turbine engine 10 can be any suitable gas turbine engine used in modern commercial and military aviation or it could be a variety of other known gas turbine engines such as a turboprop or turboshaft. The type and specifics of the gas turbine engine 10 are not germane to the invention and will not be described further herein. While an S/G 14 is shown and described, aspects of the disclosure can include any electrical machine or generator, and are not limited to generator aspects that can provide starting functionality.

Figure 2:
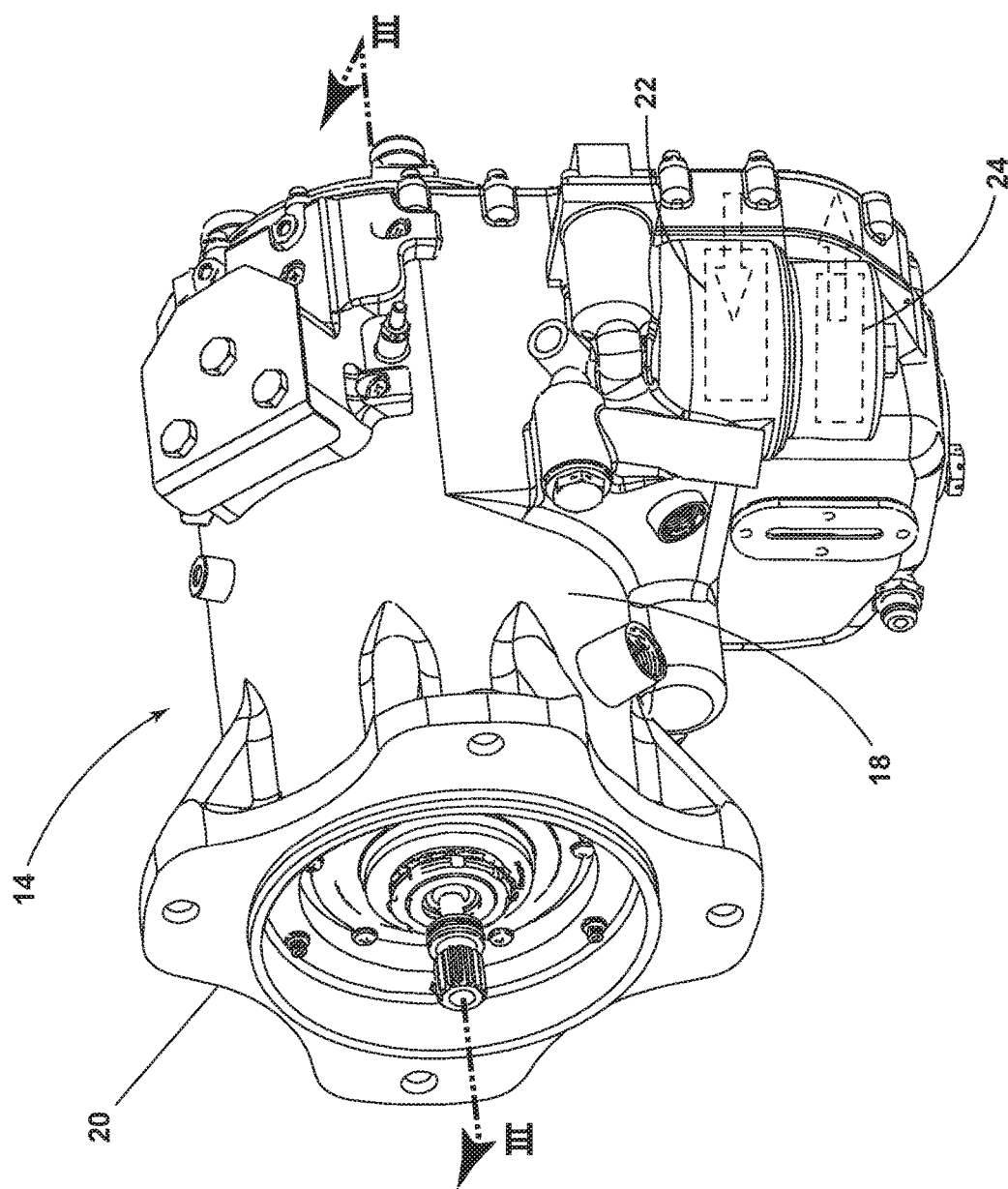
FIG. 2 is a perspective view of an exterior of the generator of FIG. 1, in accordance with various aspects described herein.

FIG. 2 more clearly illustrates the S/G 14 and its housing 18, which can include a clamping interface 20, used to clamp the S/G 14 to the AGB 12. Multiple electrical connections can be provided on the exterior of the S/G 14 to provide for the transfer of electrical power to and from the S/G 14. The electrical connections can be further connected by cables to an electrical power distribution node of an aircraft having the gas turbine engine 10 to power various items on the aircraft, such as lights and seat-back monitors. The S/G 14 includes a liquid coolant system for cooling or dissipating heat generated by components of the S/G 14 or by components proximate to the S/G 14, one non-limiting example of which can be the gas turbine engine 10. For example, the S/G 14 can include a liquid cooling system using oil as a coolant. The liquid cooling system can include a cooling fluid inlet port 22 and a cooling fluid outlet port 24 for controlling the supply of coolant to the S/G 14. While not shown, aspects of the disclosure can further include other liquid cooling system components, such as a liquid coolant reservoir fluidly coupled with the cooling fluid inlet port 22 and cooling fluid outlet port 24, and a liquid coolant pump to forcibly supply the coolant through the ports 22, 24 or S/G 14. Oil is merely one non-limiting example of a liquid coolant that can be used in aspects of the disclosure.

Figure 3:
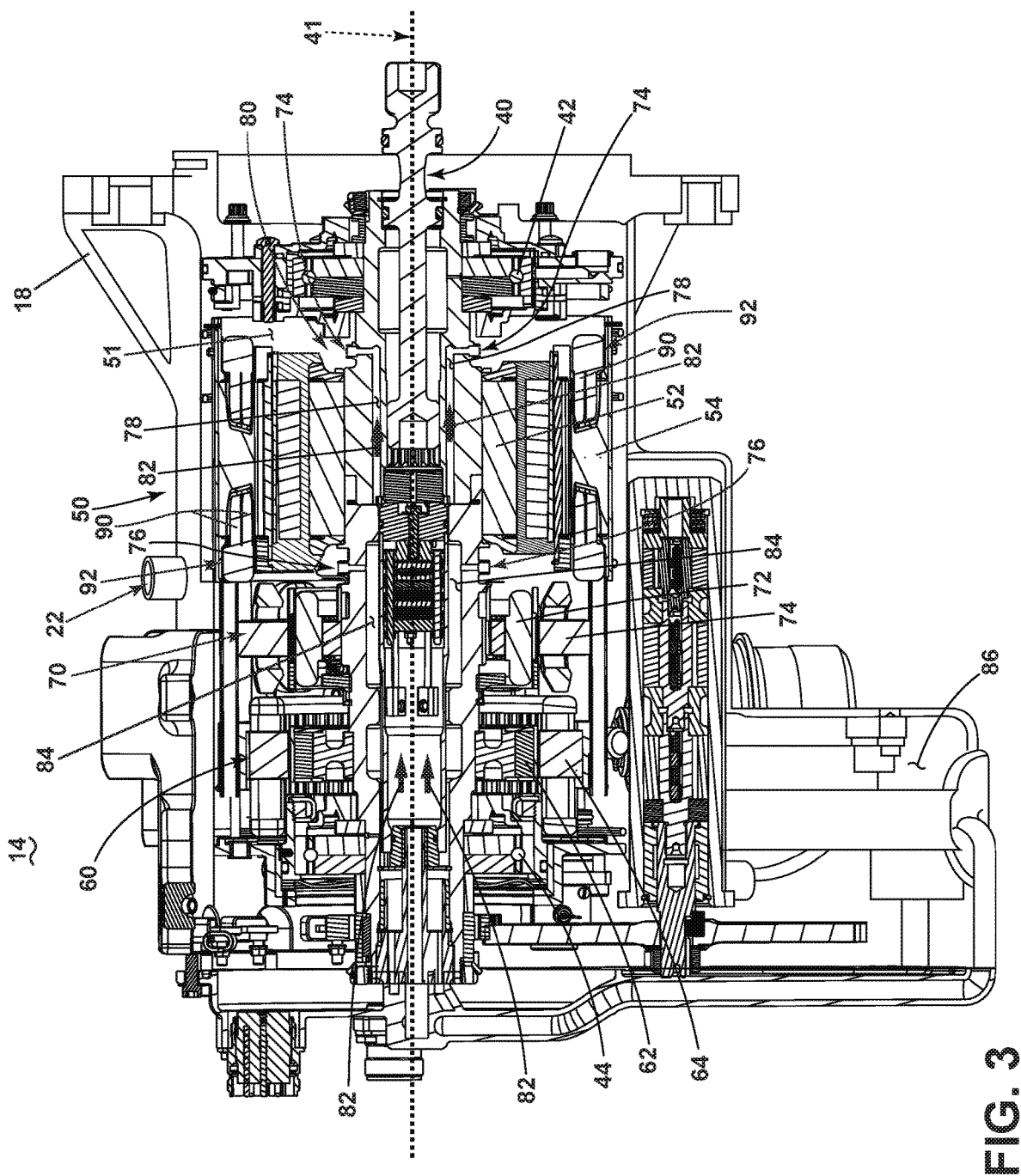
FIG. 3 is a schematic cross-sectional view of the S/G, taken along line of FIG. 2, in accordance with various aspects described herein.

The interior of the S/G 14 is best seen in FIG. 3, which is a sectional view of the S/G 14 shown in FIG. 2. A rotatable shaft 40 is located within the S/G 14 and is the primary structure for supporting a variety of components. The rotatable shaft 40 can have a single diameter or one that can vary along its length. The rotatable shaft 40 is supported by spaced bearings 42 and 44 and configured to rotate about axis of rotation 41. Several of the elements of the S/G 14 have a fixed component and a rotating component, with the rotating component being provided on the rotatable shaft 40. Examples of these elements can include a main machine 50, housed within a main machine cavity 51, an exciter 60, and a permanent magnet generator (PMG) 70. The corresponding rotating component (i.e. the rotor) comprises a main machine rotor 52, an exciter rotor 62, and a PMG rotor 72, respectively, and the corresponding fixed component comprises a main machine stator 54 or stator core, an exciter stator 64, and a PMG stator 75. In this manner, the main machine rotor 52, exciter rotor 62, and PMG rotor 72 are disposed on the rotatable shaft 40. The fixed components can be mounted to a suitable part of the housing 18. The main machine stator 54, exciter stator 64, and PMG stator 75 define an interior through which the rotatable shaft 40 extends. In one non-limiting aspect of the disclosure, the spaced bearings 42, 44 can optionally include a sealing element configured or arranged to enable the fluid sealing of the main machine cavity 51 from other compartments of the S/G 14, or from the external environment of the S/G 14.

It will be understood that the main machine rotor 52, exciter rotor 62, and PMG rotor 72 can have a set of rotor poles, including, but not limited to two rotor poles, and that the main machine stator 54, exciter stator 64, and PMG stator 75 can have a set of stator teeth or stator poles, including, but not limited to two stator teeth or stator poles. The set of rotor poles can generate a set of magnetic fields relative to the set of stator poles, such that the S/G 14 can operate through the interaction of the magnetic fields and current-carrying conductors to generate force or electrical power. The exciter 60 can provide direct current to the main machine 50 and the main machine 50 and PMG 70 can supply AC electrical power when the rotatable shaft 40 rotates.

At least one of the rotor poles or stator poles can be formed by a core with a post and wire wound about the post to form a winding, with the winding having at least one end turn. Aspects of the disclosure shown include at least one set of stator windings 90 arranged longitudinally along the stator housing 18, that is, in parallel with housing 18 and the rotor axis of rotation 41. The set of stator windings 90 can also include a set of stator winding end turns 92 extending axially beyond opposing ends of a longitudinal length of a main machine stator 54.

The components of the S/G 14 can be a combination of known generators. For example, the main machine 50 can be either a synchronous or asynchronous generator. In addition to the accessories shown in this aspect, there can be other components that need to be operated for particular applications. For example, in addition to the electromechanical accessories shown, there can be other accessories driven from the same rotatable shaft 40 such as the liquid coolant pump, a fluid compressor, or a hydraulic pump.

As explained above, the S/G 14 can be oil cooled and thus can include a cooling system 80. The cooling oil can be used to dissipate heat generated by the electrical and mechanical functions of the S/G 14. The cooling system 80 using oil can also provide for lubrication of the S/G 14. In the illustrated aspects, the S/G 14 can be configured, arranged, enabled, or the like, such that the S/G 14 can selectively configured to operate as a wet cavity generator or a dry cavity generator. Regardless of whether the S/G 14 is configured to operate as a wet cavity generator or a dry cavity generator, the S/G 14 can include the cooling system 80 including the cooling fluid inlet port 22 and the cooling fluid outlet port 24 for controlling the supply of the cooling fluid to the cooling system 80. The cooling system 80 can further include, for example, a cooling fluid reservoir 86 and various cooling passages. The rotatable shaft 40 can provide one or more flow channels or paths, including a first set of flow channels 78 fluidly coupling the rotatable shaft 40 with a first set of coolant apertures, illustrated as fluid ports 74, and a second set of flow channels 84 fluidly coupling the rotatable shaft 40 with a second set of coolant apertures, illustrated as fluid ports 76. As shown, the main machine rotor 52 includes the first set of fluid ports 74 and the second set of fluid ports 76, illustrated as axially spaced (e.g. along the longitudinal axis of the main machine rotor 52) fluid ports 74, 76, which are arranged or disposed on an outward-facing circumferential face of the rotor 52. The first set of flow channels 78, the second set of flow channels 84, or a combination thereof can enable the flow of cooling fluid, such as oil, for the main machine rotor 52, exciter rotor 62, and PMG rotor 72. In the illustration, the cooling flow is illustrated as arrows 82.

Figure 4:
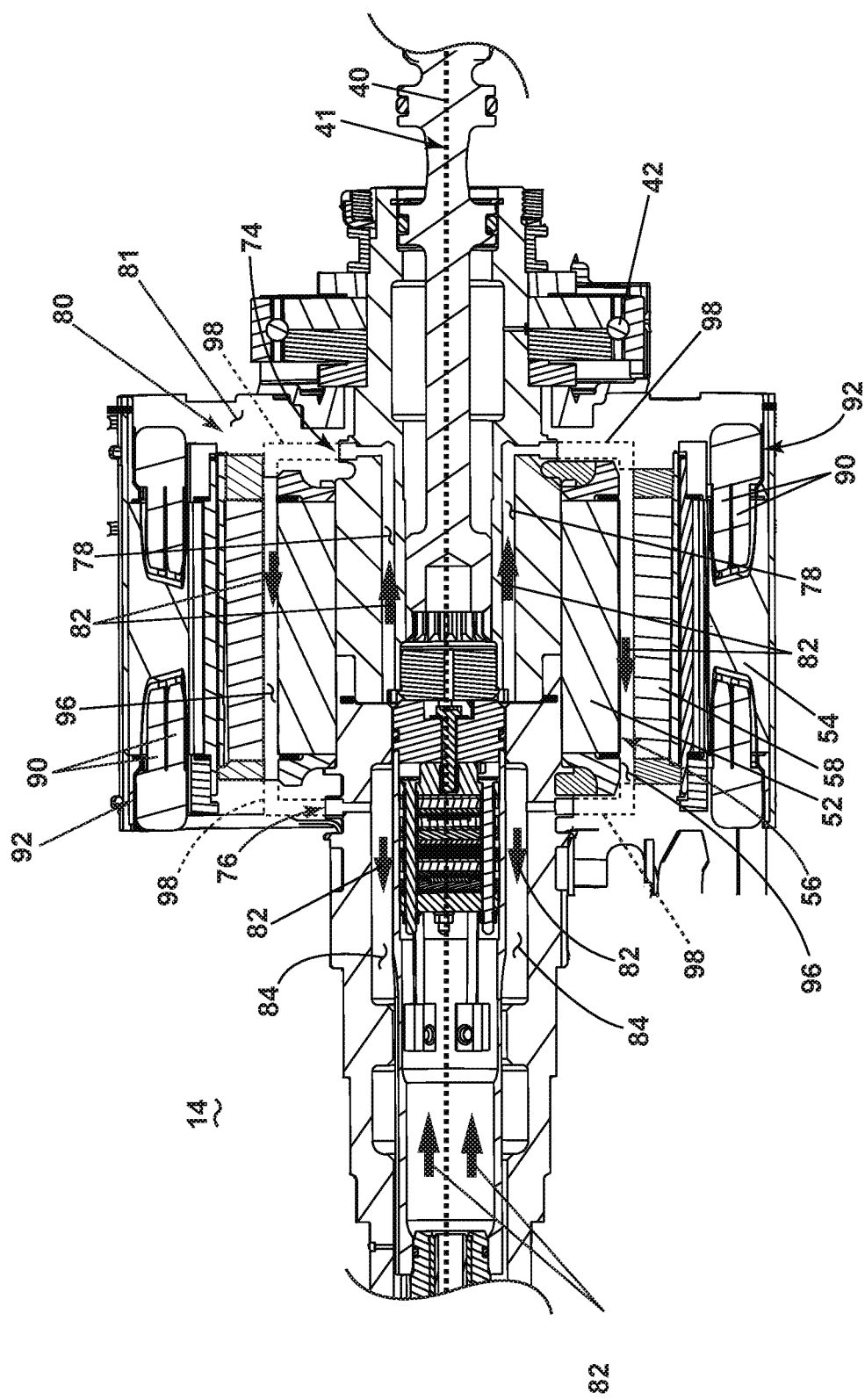
FIG. 4 is a zoomed view of the S/G of FIG. 3, illustrating the operation of a cooling system, in accordance with various aspects described herein.

FIG. 4 illustrates a zoomed view of the S/G 14 for better understanding of the operation and effect of the cooling system 80. As shown, the main machine rotor 52 can include a rotor core 56 and an axially extending set of main machine rotor windings 58 disposed proximate to the rotor core 56. A set of rotor pole or rotor winding coolant channels 96 can be located adjacent to or proximate to at least one of the rotor core 56 or the rotor windings 58, or can extend axially parallel to the at least one of the rotor core 56 or the rotor windings 58. In this sense, the rotor winding coolant channels 96 can be arranged to provide an optional fluid flow path along the at least one of the rotor core 56 or the rotor windings 58.

In one non-limiting aspect of the disclosure, the cooling system 80 can include a set of optionally installable or mountable coolant tubes 98 fluidly coupling the first and second flow channels, respectively, with the rotor winding coolant channels 96. For instance, in the non-limiting aspect illustrated, the set of coolant tubes 98 can be installed or mounted with the respective sets of first or second fluid ports 74, 76 to establish or define a coolant flow 82 wherein coolant traverses the rotatable shaft 40, through the first set of flow channels 78, out of the first set of fluid ports 74 into the set of coolant tubes 98, through the set of rotor winding coolant channels 96, through the set of coolant tubes 98 into the second fluid port 76, and through the second set of flow channels 84. From the second set of flow channels 84, the coolant can continue to be cycled through the coolant flow 82 or removed from the coolant flow 82, or removed from the S/G 14. Non-limiting aspects of the disclosure can be included wherein the coolant tubes 98 can be installed or mounted with the rotor 52, the first or second set of fluid ports 74, 76, the rotor winding coolant channels 96, or a proximate element thereto, by a coupling or mounting mechanisms including, but not limited to, mechanical interfaces (e.g. screw mounting), adhesives, welding, etc. While the first and second set of fluid ports 74, 76 are illustrated coupled with a set of coolant tubes 98, aspects of the disclosure can be included wherein a subset of the first set of fluid ports 74, a subset of the second set of fluid ports 76, or a subset of first and second fluid ports 74, 76 can be coupled with the set of coolant tubes 98. For instance, in one non-limiting aspect of the disclosure, a subset of fluid ports 74, 76 not coupled with a coolant tube 98 can be removably or permanently plugged or closed.

In this sense, the illustrated view of FIG. 4 includes an S/G 14 having a dry cavity cooling system 80, wherein the coolant is contained and not exposed to the main machine cavity 51.

Figure 5:
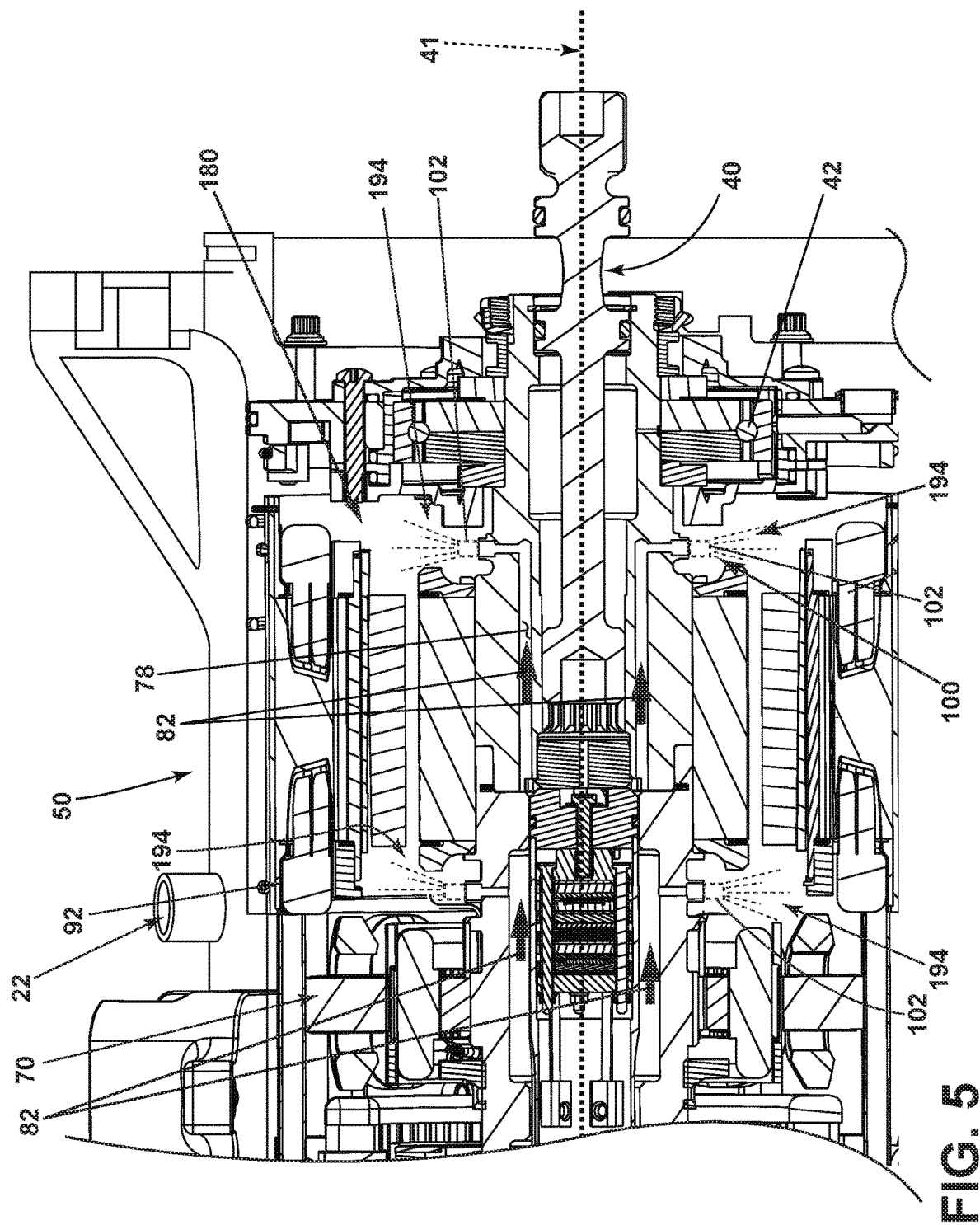
FIG. 5 is a zoomed view of the S/G of FIG. 3, illustrating another operation of a cooling system, in accordance with various aspects described herein.

FIG. 5 illustrates another zoomed view of the S/G 114 for better understanding of the operation and effect of another aspect of the present disclosure. The S/G 114 is similar to the S/G 14; therefore, like parts will be identified with like numerals increased by 100, with it being understood that the description of the like parts of the S/G 14 applies to the avionics S/G 114, unless otherwise noted. One difference is that cooling system 180 of FIG. 5 includes a set of optionally installable or mountable spray nozzles 100 having a spray tip 102 configured to enable the expelling of coolant. The set of spray nozzles 100 can be installed, coupled, or mounted at, within, or proximate to the first set of fluid ports 74 to establish or define a coolant flow 82 wherein coolant traverses the rotatable shaft 40, through the first set of flow channels 78, through the first set of fluid ports 74 into the set of spray nozzles 100, and exposed, sprayed, ejected, or otherwise deposited out of the spray tip into the main machine cavity 51. Likewise, the set of spray nozzles 100 can be installed, coupled, or mounted at, within, or proximate to the second set of fluid ports 76 to establish or define a coolant flow 82 wherein coolant traverses the rotatable shaft 40, through the second set of flow channels 84, through the second set of fluid ports 76 into the set of spray nozzles 100, and exposed, sprayed, ejected, or otherwise deposited out of the spray tip into the main machine cavity 51. While the first and second set of fluid ports 74, 76 are illustrated coupled with a set of spray nozzles 100, aspects of the disclosure can be included wherein a subset of the first set of fluid ports 74, a subset of the second set of fluid ports 76, or a subset of first and second fluid ports 74, 76 can be coupled with the set of spray nozzles 100. For instance, in one non-limiting aspect of the disclosure, a subset of fluid ports 74, 76 not coupled with a spray nozzle 100 can be removably or permanently plugged or closed.

At least one of the spray nozzle 100 or spray tip 102 can be selected, configured, directed, arranged, or the like, to expose at least a portion of the main machine cavity 51 to the coolant passing though the respective channels 78, 84. In one non-limiting aspect of the disclosure, as the rotatable shaft 40 rotates, the set of spray nozzles 100 can be rotated about the shaft 40 such that cooling fluid traversing the flow channels 78, 84 can be exposed, sprayed, ejected or otherwise deposited into the cavity 51, such as onto the set of stator windings 90, set of stator winding end turns 92, the set of rotor windings 58, into the rotor winding coolant channels 96, onto alternative or additional components proximate to the rotational path of the set of spray nozzles 100, or a combination thereof. Non-limiting aspects of the disclosure can be included wherein the spray nozzles 100 can be installed or mounted with the rotor 52, the first or second set of fluid ports 74, 76, or a proximate element thereto, by a coupling or mounting mechanisms including, but not limited to, mechanical interfaces (e.g. screw mounting), adhesives, welding, etc.

In this sense, the rotating spray nozzles 100 or spray tips 102 can be rotably or fixedly located proximate to the set of stator winding end turns 92 (or a set or a subset of the aforementioned components), or accessible to liquid droplets dispersed therefrom. In the illustrated aspects, the exposure, spray, or depositing has been illustrated as a schematic spray stream 194 or spray of droplets. In this sense, the illustrated view of FIG. 5 includes an S/G 114 having a wet cavity cooling system 180, wherein the coolant is cavity 51 is exposed to liquid coolant.

Aspects of the wet cavity cooling system 180 can further be included, wherein the optional sealing elements of the spaced bearings 42, 44 can be eliminated, removed, or the like, and thus, allow or enable the exposure of the coolant or oil of the main machine cavity 51 to other compartments of the S/G 14. Additionally, aspects of the disclosure can include configurations, arrangements, or the like wherein the rotatable shaft 40 can be altered, or wherein at least one of the first set of flow channels 78, the second set of flow channels 84, or another flow channel fluidly coupling at least one of the first or second flow channels 78, 84 with the coolant can enable or direct the coolant to flow as described herein.

The aspects of the disclosure provide for or enable a generator that can be configured to operate in a wet cavity configuration or a dry cavity configuration, as described. It is further apparent from the aspects of the disclosure that the above-described configurations can be utilized to select, modify, or otherwise convert the cooling system operation of a dry cavity generator to a wet cavity generator, or vice versa.

For example, in one non-limiting aspect of the disclosure, a dry cavity generator having a set of coolant tubes 98 described herein can be altered or modified such that the coolant tubes 98 can be cut, removed, eliminated, or the like, from the respective first or second fluid ports 74, 76, and replaced with a set of spray nozzles 100 having spray tips 102 selected, configured, directed, arranged, or the like, to expose at least a portion of the main machine cavity 51 to the coolant passing though the respective channels 78, 84. In another non-limiting aspect of the disclosure, a wet cavity generator having a set of spray nozzles 100 and rotor winding coolant channels 96 can be altered or modified such that the spray nozzles 100 can be cut, removed, or the like, from the respective first or second fluid ports 74, 76, and replaced with a set of coolant tubes 98 to establish or define a coolant flow path traversing the rotor winding coolant channels 96, as described above. In this sense, a dry or wet cavity generator can be selectably configured based on the desired operating characteristics or environment.

Figure 6:
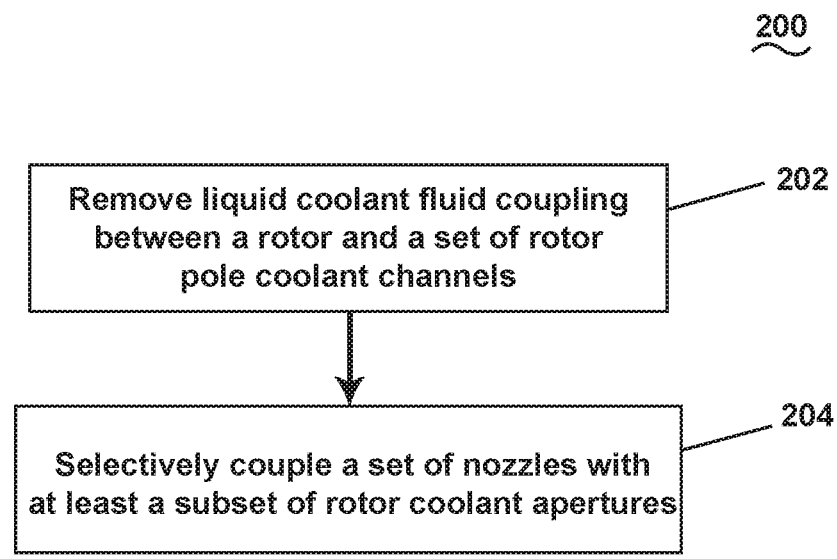
FIG. 6 is a flowchart illustrating a method of converting a dry cavity generator to a wet cavity generator, in accordance with various aspects described herein.

FIG. 6 illustrates a method 200 for converting a dry cavity generator to a wet cavity generator according to the aspects of the disclosure. The method 200 begins by removing a liquid coolant fluid coupling, such as the coolant tubes 98 between the rotatable shaft 40 and the rotor winding coolant channels 96, at 202. Next, the method 200 proceeds to selectively coupling a set of nozzles, such as spray nozzles 100, with at least a subset of the rotor coolant apertures or fluid ports 74, 76 such that liquid coolant traversing the at least one of the rotor channels 78, 84 is ejected from the set of spray nozzles 100 to at least a set of stator winding end turns 92 to extract heat from the stator windings 90, 92 during generator operation.

Figure 7:
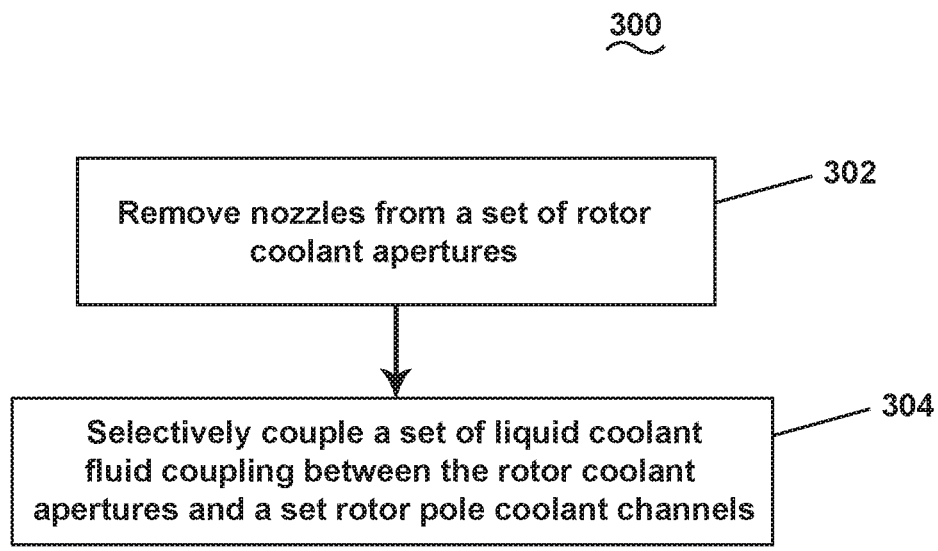
FIG. 7 is a flowchart illustrating a method of converting a wet cavity generator to a dry cavity generator, in accordance with various aspects described herein.

FIG. 7 further illustrates a method 300 for converting a wet cavity generator to a dry cavity generator according to aspects of the disclosure. The method 300 begins by removing a set of nozzles, such as spray nozzles 100, from the rotatable shaft 40 or a set of fluid ports 74, 76 at 302. Next, the method 300 proceeds to selectively coupling a set of liquid coolant fluid coupling, such as the coolant tubes 98 between the rotatable shaft 40 or a subset of the fluid ports 74, 76 and the rotor winding coolant channels 96, such that liquid coolant traversing the at least one of the rotor channels 78, 84 traverses the rotor winding coolant channel 96 to extract heat from the rotor windings 58 during generator operation.

Figure 8:
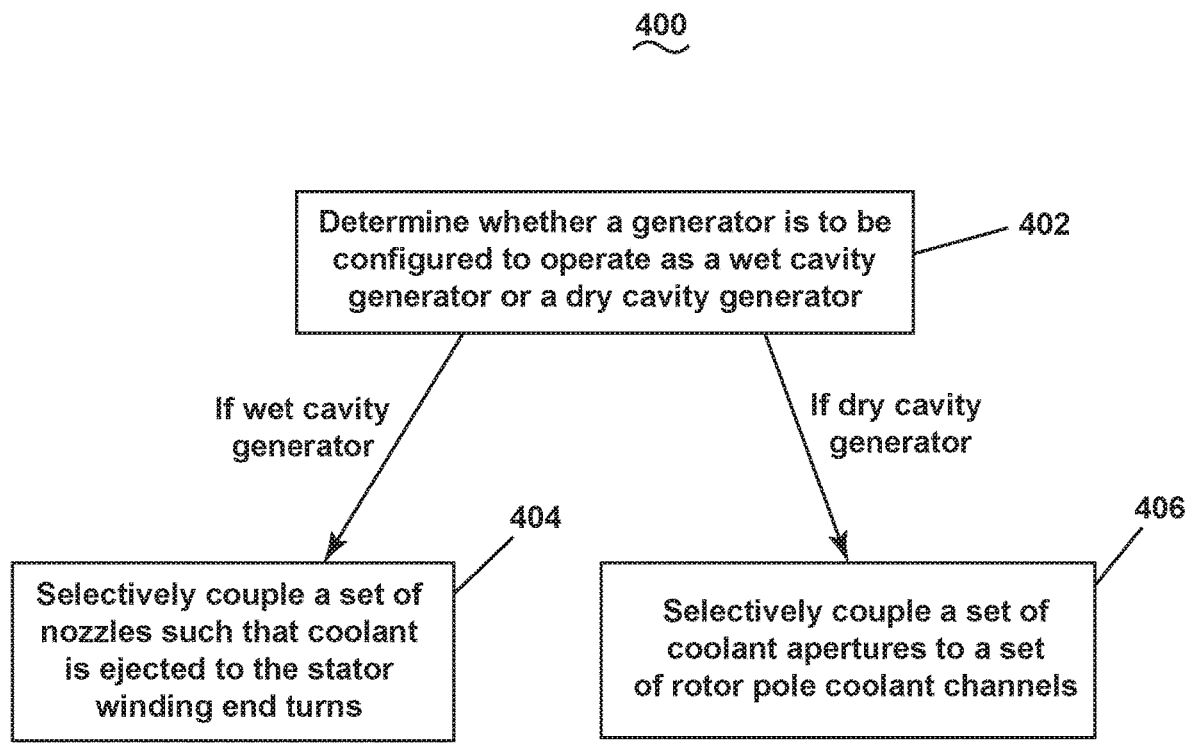
FIG. 8 is a flowchart illustrating a method of assembling generator, in accordance with various aspects described herein.

FIG. 8 further illustrates a method 400 for assembling a generator according to aspects of the disclosure. The method 400 begins by determining whether a generator having a stator core, such as a main machine stator 54, with a set of stator winding end turns 92, and a rotor with a rotor channel fluidly connected to a set of coolant apertures and a set of rotor pole or rotor winding coolant channels 96 aligned with and proximate to a set of rotor poles and fluidly connected to the rotor channel is to be configured to operate as a wet cavity generator or a dry cavity generator, at 402. If the generator is to operate as a wet cavity generator, the method 400 proceeds to selectively coupling a set of nozzles, such as the spray nozzles 100, with at least a subset of the coolant apertures or fluid ports 74, 76 such that liquid coolant traversing the rotor channel is ejected from the set of spray nozzles 100 to at least the stator winding end turns 92 to extract heat from the stator windings 90, 92 during generator operation, at 404. If the generator is to operate as a dry cavity generator, the method 400 proceeds to selectively fluidly coupling at least a subset of the coolant apertures or fluid ports 74, 76 to the set of rotor pole or rotor winding coolant channels 96 aligned with and proximate to the set of rotor poles such that liquid coolant traversing the rotor channel flows through the rotor winding coolant channels 96 to extract heat from the set of rotor poles or rotor windings 58 during generator operation, at 406.

The sequences depicted in the above-described methods 200, 300, 400 are for illustrative purposes only and are not meant to limit the methods 200, 300, 400 in any way as it is understood that the portions of the methods 200, 300, 400 can proceed in a different logical order, additional or intervening portions can be included, or described portions of the methods 200, 300, 400 can be divided into multiple portions, or described portions of the methods 200, 300, 400 can be omitted without detracting from the described methods 200, 300, 400.

Many other possible aspects, embodiments, or configurations in addition to that shown in the above figures are contemplated by the present disclosure. For example, while the above-described aspects of the disclosure refer to the respective fluid ports 74, 76, further aspects of the disclosure can be included wherein additional fluid ports can be drilled, manufactured, installed, or otherwise opened to provide access to the coolant traversing the rotatable shaft 40. In one non-limiting aspect, the additional fluid ports can be arranged on the rotatable shaft 40 between existing fluid ports 74, 76. In this sense, they can be arranged enable additional or different spray streams 194 when fitted, coupled, or mounted with a spray nozzle 100, selectively configured to provide coolant delivery to the rotor winding cooling channels, or a combination thereof. Additionally, the design and placement of the various components can be rearranged such that a number of different in-line configurations could be realized.

The aspects disclosed herein provide for selectively enabling a generator to operate as a wet cavity generator or a dry cavity generator, or for selectively converting between the configurations. One advantage of the above-described aspects is that the generator can be selectively operable in either configuration, or a combination of configurations, to provide electrical power generation according to desired environmental operational characteristics. Thus, a single generator that can be selective configured to operate as a wet or dry cavity generator can result in lower development, testing, verification tests, and the like.

The above-described generator and method for selectively operating can also reduce maintenance costs by allowing for converting of one cooling form to another without having to significantly replace or redesign the generator. The resulting common generator aspects can utilize common parts for repair and replacement regardless of the cooling form of the generator. By utilizing common parts, a fleet of generators can be maintained using fewer total parts, less maintenance training (due to a reduced total number of replaceable or utilized components), reduced part and generator unit costs, and minimized non-recurring engineering costs.

To the extent not already described, the different features and structures of the various aspects can be used in combination with others as desired. That one feature cannot be illustrated in some of the aspects is not meant to be construed that it cannot be, but is done for brevity of description. Thus, the various features of the different aspects can be mixed and matched as desired to form new aspects, whether or not the new aspects are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A generator comprising:
   a stator core having a set of stator poles formed by a post and a wire wound about the post to form a stator winding, with the stator winding having end turns;
   a rotor having a set of rotor poles and configured to rotate relative to the stator and a rotor channel for liquid coolant to flow through the rotor to a set of coolant apertures;
   a set of rotor pole coolant channels aligned with and proximate to the set of rotor poles;
   a liquid coolant coupling removably disposed to fluidly couple at least a subset of the coolant apertures to the rotor pole coolant channels at such that liquid coolant traversing the rotor channel flows through the rotor pole coolant channels to extract heat from the set of rotor poles;
   a set of nozzles removably disposed to fluidly couple at least a subset of the coolant apertures such that liquid coolant traversing the rotor channel is ejected from the set of nozzles to the stator winding end turns during generator operation;
   wherein the generator is selectively configurable to operate as a wet cavity generator by removing the liquid coolant coupling; and
   wherein the generator is selectively configurable as a dry cavity generator by removing the set of nozzles.

2. The generator of claim 1 wherein the set of nozzles are selectively configured such that liquid coolant traversing the rotor channel is ejected from the set of nozzles to the set of rotor poles.

3. The generator of claim 1 wherein the set of nozzles are selectively configured such that at least a portion of liquid coolant traversing the rotor channel is ejected from the set of nozzles into the rotor pole coolant channels.

4. The generator of claim 1, further comprising a housing for the stator core and the rotor, and wherein the rotor is at least partially supported by the housing by a set of bearings.

5. The generator of claim 4 wherein the set of bearings include a sealing element configured to prevent liquid coolant in the wet cavity generator from escaping the housing.

6. The generator of claim 1 wherein the coolant apertures are configured to selectively receive at least one of the set of nozzles or a set of coolant tubes.

7. The generator of claim 6 wherein the set of coolant tubes are selectively removable.

8. The generator of claim 1 wherein the coolant apertures are disposed on an outward-facing circumferential face of the rotor.

9. The generator of claim 8 wherein the coolant apertures are disposed such that they are circumferentially-aligned with a respective rotor pole coolant channel.

10. The generator of claim 1 wherein at least a subset of the coolant apertures are selectively plugged to prevent liquid coolant from traversing through the subset of the coolant apertures.

11. The generator of claim 1 wherein the set of rotor pole coolant channels in the dry cavity generator are fluidly coupled with a set of coolant apertures by way of a set of coolant tubes.

12. The generator of claim 11 wherein the set of coolant tubes are selectively removable.

13. The generator of claim 11 wherein the set of coolant tubes are selectively removable.

14. The generator of claim 1 wherein the set of nozzles are selectively removable.

15. A method of assembling a generator comprising:
    determining whether a generator having a stator core with a set of stator winding end turns and a rotor with a rotor channel fluidly connected to a set of coolant apertures, a set of rotor pole coolant channels aligned with and proximate to a set of rotor poles and fluidly connected to the rotor channel, a liquid coolant coupling removably disposed to fluidly couple at least a subset of the coolant apertures to the rotor pole coolant channels, and a set of nozzles removably disposed to fluidly couple at least a subset of the coolant apertures is to be configured to operate as a wet cavity generator or a dry cavity generator;
    if the generator is to operate as a wet cavity generator, selectively removing the liquid coolant coupling; and
    if the generator is to operate as a dry cavity generator, selectively removing the set of nozzles.

16. The method of claim 15, further comprising sealing the cavity of the wet cavity generator such that liquid coolant cannot escape the cavity.

17. The method of claim 15 wherein the selectively coupling the set of nozzles of the wet cavity generator includes aligning the set of nozzles to direct at least a portion of the liquid coolant ejected from the set of nozzles to the set of rotor poles to extract heat from the set of rotor poles during generator operation.

18. The method of claim 15 wherein the selectively coupling the set of nozzles of the wet cavity generator includes aligning the set of nozzles to direct at least a portion of the liquid coolant ejected from the set of nozzles into the rotor pole coolant channels to extract heat from the set of rotor poles during generator operation.

19. The method of claim 15, further comprising disposing the at least a subset of the coolant apertures of the dry cavity generator such that they are circumferentially-aligned with a respective rotor pole coolant channel.

20. A method of converting a dry cavity generator to a wet cavity generator comprising:
    removing a liquid coolant fluid coupling between a rotor and a set rotor pole coolant channels aligned with and proximate to a set of rotor poles;
    leaving a set of rotor coolant apertures fluidly coupled with a rotor channel for liquid coolant; and
    selectively coupling a set of nozzles with at least a subset of the rotor coolant apertures such that liquid coolant traversing the rotor channel is ejected from the set of nozzles to a set of stator winding end turns to extract heat from the stator windings during generator operation.

21. The method of claim 20 wherein the selectively coupling the set of nozzles includes aligning the set of nozzles to direct at least a portion of the liquid coolant ejected from the set of nozzles to the rotor to extract heat from the rotor during generator operation.

22. The method of claim 20 wherein the selectively coupling the set of nozzles of the wet cavity generator includes aligning the set of nozzles to direct at least a portion of the liquid coolant ejected from the set of nozzles into the rotor pole coolant channels to extract heat from the set of rotor poles during generator operation.

* * * * *